(12) United States Patent
Miura et al.

(10) Patent No.: US 12,189,175 B2
(45) Date of Patent: Jan. 7, 2025

(54) PLANAR LIGHT SOURCE

(71) Applicant: NICHIA CORPORATION, Anan (JP)

(72) Inventors: Yukihiro Miura, Tokushima (JP);
Ryohei Yamashita, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/456,271

(22) Filed: Aug. 25, 2023

(65) Prior Publication Data

US 2024/0069270 A1 Feb. 29, 2024

(30) Foreign Application Priority Data

Aug. 30, 2022 (JP) .................. 2022-136538

(51) Int. Cl.
*F21V 8/00* (2006.01)

(52) U.S. Cl.
CPC ......... *G02B 6/0091* (2013.01); *G02B 6/0013* (2013.01)

(58) Field of Classification Search
CPC ............................. G02B 6/0091; G02B 6/0013
See application file for complete search history.

(56) References Cited

U.S. PATENT DOCUMENTS

| 2014/0362327 | A1 | 12/2014 | Ohkubo et al. |
| 2017/0059768 | A1* | 3/2017 | Kang .................. G02B 6/0091 |
| 2020/0005710 | A1 | 1/2020 | Miyata et al. |
| 2021/0199875 | A1* | 7/2021 | Okahisa .................. H01L 33/58 |

FOREIGN PATENT DOCUMENTS

| JP | 2002-216525 A | 8/2002 |
| JP | 2006-276601 A | 10/2006 |
| JP | 2012-154970 A | 8/2012 |
| JP | 2014-517472 A | 7/2014 |
| JP | 2014-238497 A | 12/2014 |
| JP | 2020-004708 A | 1/2020 |
| JP | 2021-106114 A | 7/2021 |
| WO | WO-2012/158894 A2 | 11/2012 |

OTHER PUBLICATIONS

Urano et al., CN 102879951, Jan. 2013 (Year: 2013).*
Na et al., WO 2014193094, Dec. 2014 (Year: 2014).*

* cited by examiner

*Primary Examiner* — Mary Ellen Bowman
(74) *Attorney, Agent, or Firm* — Foley & Lardner LLP (57) ABSTRACT

A planar light source includes a first substrate including a first part and a second part; a light source located at an upper surface side of the first part; a light guide member located at the upper surface side of the first part; and a circuit member overlapping the light guide member in a direction parallel to an upper surface of the first part. The circuit member includes a second substrate located at an upper surface side or a lower surface side of the second part, and an electronic element located on the second substrate.

20 Claims, 7 Drawing Sheets

PLANAR LIGHT SOURCE

CROSS-REFERENCE TO RELATED APPLICATION

This application claims priority to Japanese Patent Application No. 2022-136538, filed on Aug. 30, 2022, the disclosure of which is hereby incorporated by reference in its entirety.

BACKGROUND

The present disclosure relates to a planar light source.

Japanese Patent Publication No. 2020-004708 discusses a backlight that includes an LED driver substrate and an LED substrate.

SUMMARY

It is desirable to reduce the width of the frame at the periphery of a liquid crystal panel of a liquid crystal display. An object of the present disclosure is to provide a planar light source in which the planar size can be reduced.

According to one embodiment, a planar light source includes a first substrate including a first part and a second part; a light source located at an upper surface side of the first part; a light guide member located at the upper surface side of the first part; and a circuit member overlapping the light guide member in a direction parallel to an upper surface of the first part. The circuit member includes a second substrate located at an upper surface side or a lower surface side of the second part, and an electronic element located at the second substrate.

According to the present disclosure can provide a planar light source in which the planar size can be reduced.

DETAILED DESCRIPTION OF EMBODIMENTS

Planar light sources of embodiments will now be described with reference to the drawings. Unless specifically stated, the dimensions, materials, shapes, relative arrangements, and the like of the components according to the embodiments are not intended to limit the scope of the invention to those only, and are merely illustrative examples. The sizes, positional relationships, and the like of the members shown in the drawings may be exaggerated for clarity of description. In the following description, the same names and reference numerals indicate the same or similar members; and a detailed description is omitted as appropriate. End views that show only cross sections may be used as cross-sectional views.

In the following description, terms that indicate specific directions or positions (e.g., "above," "below," and other terms including or related to such terms) may be used. Such terms, however, are used merely for better understanding of relative directions or positions when referring to the drawings. As long as the relationships are the same, the relative directions or positions according to terms such as "above," "below," etc., used when referring to the drawings may not have the same arrangements in drawings, actual products, and the like outside the disclosure. In the specification, when assuming that there are, for example, two members, the positional relationship expressed as "above (or below)" includes the case where the two members are in contact, and the case where the two members are not in contact so that one of the members is positioned above (or below) the other member. Unless specifically stated, a member covering a covered object includes the case where the member contacts the covered object and directly covers the covered object, and the case where the member indirectly covers the covered object without contacting the covered object.

Directions may be indicated using an X-axis, a Y-axis, and a Z-axis in the drawings below. The X-axis, the Y-axis, and the Z-axis are orthogonal to each other. The light-emitting surface of the planar light source is parallel to the XY plane, and the Z-axis is orthogonal to the XY plane. For example, in the specification, a direction along the X-axis is taken as a first direction X, a direction along the Y-axis is taken as a second direction Y, and a direction along the Z-axis is taken as a third direction Z. In the specification, unless otherwise mentioned, the thickness of each member is the value at which the distance from the upper surface to the lower surface of the member in the third direction Z is a maximum. In the specification, "parallel" includes not only the case where two straight lines, sides, surfaces, etc., do not cross even when extended, but also the case where the two straight lines, sides, surfaces, etc., cross at an angle within 10°.

First Embodiment

Figure 1:
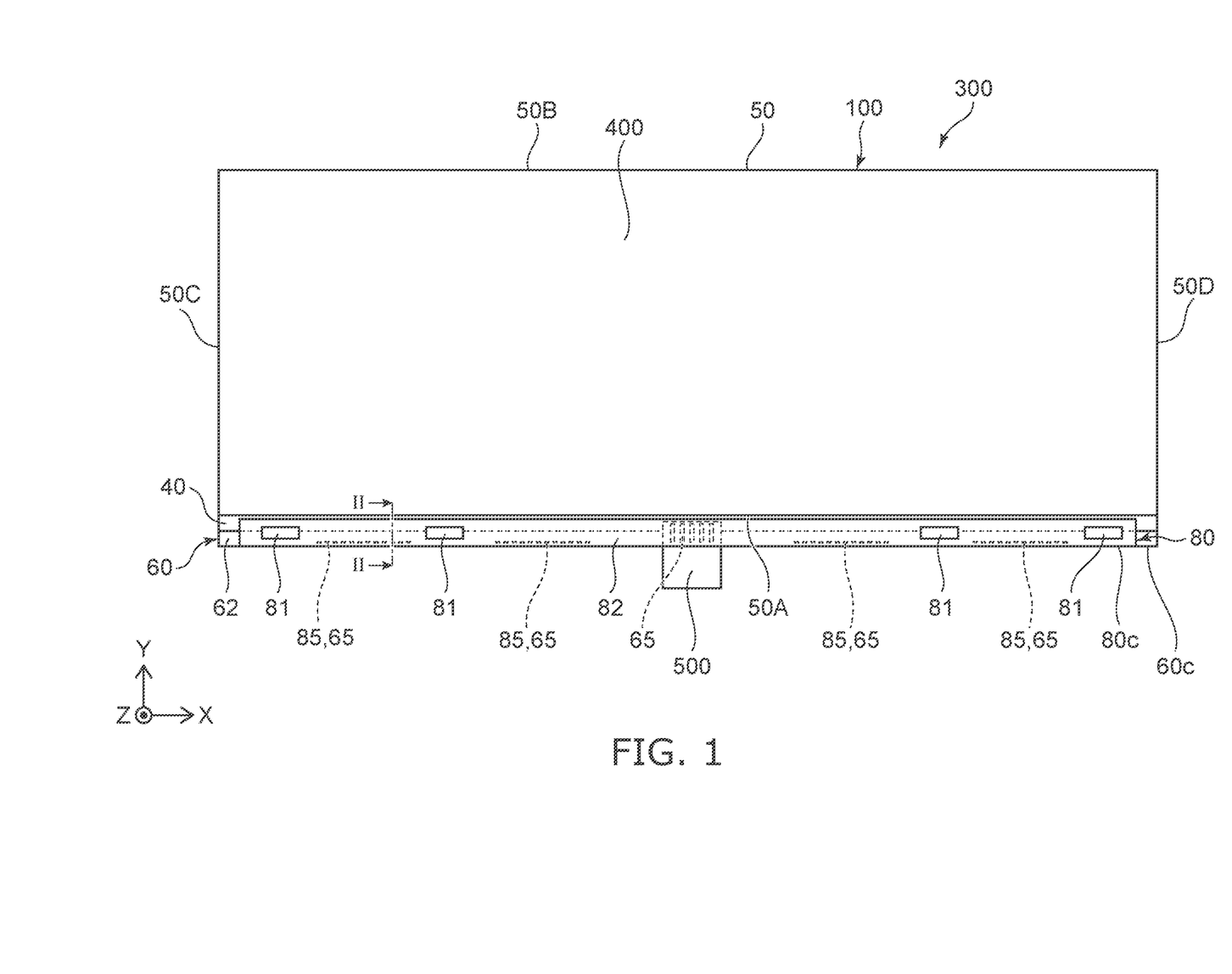
FIG. 1 is a schematic top view of a planar light source of a first embodiment.

A planar light source 300 of a first embodiment will now be described with reference to FIGS. 1, 2, 7, and 8. As shown in FIG. 1, the planar light source 300 includes a light-emitting module 100 and a circuit member 80. As shown in FIG. 8, the light-emitting module 100 includes a first substrate 60, a light source 10, and a light guide member 50.

As shown in FIG. 1, in a top view, the light guide member 50 includes four outermost lateral surfaces including a first outermost lateral surface 50A and a second outermost lateral surface 50B extending in the first direction X, and a third outermost lateral surface 50C and a fourth outermost lateral surface 50D extending in the second direction Y. In the top view, the first outermost lateral surface 50A, the second outermost lateral surface 50B, the third outermost lateral surface 50C, and the fourth outermost lateral surface 50D of the light guide member 50 are included in the outer edge of a light-emitting surface 400 of the planar light source 300. The light-emitting surface 400 is surrounded with the first outermost lateral surface 50A, the second outermost lateral surface 50B, the third outermost lateral surface 50C, and the fourth outermost lateral surface 50D of the light guide member 50 in the top view.

In the top view, for example, the circuit member 80 is positioned outward of the light-emitting surface 400 at the first outermost lateral surface 50A side and extends in the first direction X. The circuit member 80 is exposed from the light guide member 50.

Figure 2:
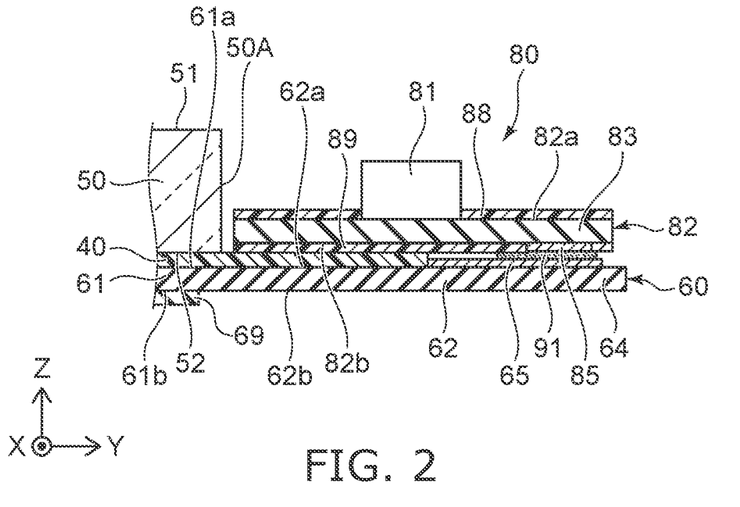
FIG. 2 is a schematic cross-sectional view along line II-II of FIG. 1.

FIG. 2 is a schematic cross-sectional view along line II-II of FIG. 1.

First Substrate

The first substrate 60 includes a first part 61 and a second part 62. The first part 61 includes an upper surface 61a, and a lower surface 61b positioned at the side opposite to the upper surface 61a in the third direction Z. The light source 10 and the light guide member 50 are located at the upper surface 61a side of the first part 61. The second part 62 is continuous with the first part 61 and extends outward of the light guide member 50 from the outermost lateral surface of the light guide member 50. In the example of FIG. 2, the second part 62 extends outward from the first outermost lateral surface 50A side. The second part 62 includes an upper surface 62a that is continuous with the upper surface 61a of the first part 61, and a lower surface 62b that is positioned at the side opposite to the upper surface 62a in the third direction Z and is continuous with the lower surface 61b of the first part 61.

The first substrate 60 includes a first base member 64 and a first conductive part 65. The first conductive part 65 is located at the upper surface of the first base member 64 on at least the second part 62. The upper surface 61a of the first part 61 includes the upper surface of the first base member 64. The upper surface 62a of the second part 62 includes the upper surface of the first base member 64 and the upper surface of the first conductive part 65. It is preferable for the first substrate 60 to be a flexible substrate. When the first substrate 60 is a flexible substrate, the thickness of the first substrate 60 can be reduced. The first base member 64 is formed of an insulative material. For example, a resin material such as a polyimide resin, epoxy resin, silicone resin, etc., can be used as the material of the first base member 64. For example, a metal material such as copper, aluminum, silver, etc., can be used as the material of the first conductive part 65.

Circuit Member

The circuit member 80 overlaps the light guide member 50 in a direction parallel to the upper surface 61a of the first part 61 of the first substrate 60. The direction that is parallel to the upper surface 61a of the first part 61 is a direction parallel to the light-emitting surface 400 of the planar light source 300. The upper surface 62a of the second part 62 also is parallel to the light-emitting surface 400. In the example shown in FIG. 2, the circuit member 80 is positioned at the side of the first outermost lateral surface 50A of the light guide member 50. As shown in FIG. 1, the circuit member 80 overlaps the second part 62 of the first substrate 60 in the top view.

As shown in FIG. 2, the circuit member 80 is located at the upper surface 62a side of the second part 62 of the first substrate 60. The circuit member 80 includes a second substrate 82 located at the upper surface 62a side of the second part 62, and an electronic element 81 located on the second substrate 82. The second substrate 82 includes an upper surface 82a, and a lower surface 82b positioned at the side opposite to the upper surface 82a in the third direction Z. The lower surface 82b of the second substrate 82 faces the upper surface 62a of the second part 62 of the first substrate 60. The second substrate 82 includes a second base member 83, and a second conductive part 85 located at the lower surface of the second base member 83. The second substrate 82 includes a first protective film 89 located at the lower surface of the second base member 83. At least a portion of the second conductive part 85 is exposed from the first protective film 89. The second substrate 82 includes a second protective film 88 located at the upper surface of the second base member 83. The upper surface 82a of the second substrate 82 includes the upper surface of the second protective film 88. The lower surface 82b of the second substrate 82 includes the lower surface of the second conductive part 85 and the lower surface of the first protective film 89.

The second base member 83 contains an insulative material. It is preferable for the thickness of the second base member 83 to be greater than the thickness of the first base member 64. The occurrence of warp in the second part 62 of the first base member 64 can be reduced by setting the thickness of the second base member 83 to be greater than the thickness of the first base member 64. It is preferable for the material of the second base member 83 to have a higher rigidity than the first base member 64. When the second base member 83 has a higher rigidity than the first base member 64, for example, the second base member 83 can be formed of a ceramic, or glass fibers or paper impregnated with a resin. When the second base member 83 has a higher rigidity than the first base member 64, the second substrate 82 is, for example, a rigid substrate. The occurrence of warp of the second part 62 of the first base member 64 can be reduced by setting the second base member 83 to have a higher rigidity than the first base member 64. For example, a material the same as or similar to the first base member 64 may be used as the material of the second base member 83. A material the same as or similar to the first conductive part 65 can be used as the material of the second conductive part 85. The first protective film 89 and the second protective film 88 are formed of insulative materials. For example, an epoxy resin, urethane resin, or acrylic resin can be used as the materials of the first and second protective films 89 and 88.

The electronic element 81 is located at the upper surface 82a side of the second substrate 82. The electronic element 81 is, for example, a control element that controls dimming and/or the on and off of the light source 10. The control element includes, for example, a transistor. Or, the electronic element 81 is, for example, a protection element that protects the light source 10 from static electricity. For example, a diode can be used as the protection element. The electronic element 81 may be a resistor, capacitor, integrated circuit, etc. The thickness of the electronic element 81 is greater than the thickness of the second base member 83. For example, the thickness of the electronic element 81 is not less than 0.3 mm and not more than 1.0 mm, and the thickness of the second base member 83 is not less than 0.03 mm and not more than 0.3 mm.

The electronic element 81 is electrically connected with the second conductive part 85 of the second substrate 82. The first conductive part 65 of the first substrate 60 is electrically connected with the light source 10. The first conductive part 65 and the second conductive part 85 are electrically connected. Accordingly, the electronic element 81 is electrically connected with the light source 10 via the second and first substrates 82 and 60.

As shown in FIG. 1, for example, multiple electronic elements 81 are separated from each other in the first direction X. FIG. 1 shows only the regions of the first and second conductive parts 65 and 85 at which the first conductive part 65 and the second conductive part 85 are connected. As shown in FIG. 1, the regions at which the first conductive part 65 and the second conductive part 85 are connected can be positioned not to overlap the electronic element 81 the top view. Because the regions at which the first conductive part 65 and the second conductive part 85 are connected are positioned not to overlap the electronic element 81 in the top view, when a connection member 91 described below is used to connect the first conductive part 65 and the second conductive part 85, pressure is not easily applied to the electronic element 81, and malfunction of the electronic element 81 does not occur easily. As shown in FIG. 1, the regions at which the first conductive part 65 and the second conductive part 85 are connected can be located in regions between the electronic elements 81 next to each other in the first direction X. By providing the regions at which the first conductive part 65 and the second conductive part 85 are connected in regions between the electronic elements 81 next to each other in the first direction X, when the connection member 91 connects the first conductive part 65 and the second conductive part 85, stress is not easily applied to the electronic element 81.

As shown in FIG. 1, a wiring member 500 is connected to the second part 62 of the first substrate 60 extending outward of the light guide member 50. A wiring part located at the wiring member 500 is electrically connected with the first conductive part 65 located at the second part 62 of the first substrate 60. A tip portion of the wiring member 500 is inserted into a connector of an external circuit to electrically connect the wiring part of the wiring member 500 with an electrode terminal of the connector. The planar light source 300 is thereby electrically connected with the external circuit.

According to the embodiment, the circuit member 80 is located at a position at which the circuit member 80 overlaps the second part 62 in the top view. By positioning the circuit member 80 to overlap the second part 62 that is included in a portion of the planar light source 300, the planar size of the entire planar light source 300 when including the circuit member 80 can be smaller than when the circuit member 80 is located outward of the outer edge of the planar light source 300. For example, the width of the frame (the bezel) at the periphery of the liquid crystal panel of a liquid crystal display using the planar light source 300 as a backlight can be reduced thereby, and the liquid crystal display can be smaller.

The circuit member 80 overlaps the light guide member 50 in a direction parallel to the light-emitting surface 400 of the planar light source 300. Accordingly, the thickness of the planar light source 300 can be less than when the circuit member 80 does not overlap the light guide member 50 in the direction parallel to the light-emitting surface 400 (e.g., when the circuit member 80 is located at the lower surface 62b side of the second part 62 in FIG. 2). When the planar light source 300 is used as the backlight of a liquid crystal display, the liquid crystal display can easily be thinned.

As shown in FIG. 1, it is preferable for an outer edge 80c of the circuit member 80 to be positioned inward of an outer edge 60c of the first substrate 60 in the second direction Y in the top view. Accordingly, the planar size of the planar light source 300 can be less than when the outer edge 80c of the circuit member 80 is positioned outward of the outer edge 60c of the first substrate 60. Even when the outer edge 80c of the circuit member 80 is positioned outward of the outer edge 60c of the first substrate 60, it is preferable for the maximum value of the distance in the second direction Y between the outer edge 80c of the circuit member 80 and the outer edge 60c of the first substrate 60 to be within 100 μm.

In a direction (the third direction Z) perpendicular to the upper surface 61a of the first part 61, it is preferable for the upper surface of the circuit member 80 to be positioned at a height between an upper surface 51 of the light guide member 50 and a lower surface 52 of the light guide member 50 positioned at the side opposite to the upper surface 51 in the third direction Z. In the example shown in FIG. 2, among the upper surfaces of the circuit member 80, the upper surface of the electronic element 81 is included in the uppermost surface of the circuit member 80. In other words, the upper surface of the electronic element 81 that is included in the uppermost surface of the circuit member 80 is positioned at a height between the upper surface 51 and the lower surface 52 of the light guide member 50. Accordingly, the thickness of the planar light source 300 can be less than when the uppermost surface of the circuit member 80 is positioned at a height higher than the upper surface 51 of the light guide member 50. However, the effects, on the light source 10, of the heat from the upper surface of the electronic element 81 can be reduced when the upper surface of the electronic element 81 included in the uppermost surface of the circuit member 80 is positioned higher than the upper surface 51 of the light guide member 50.

In the direction (the third direction Z) perpendicular to the upper surface 61a of the first part 61, it is preferable for the lower surface of the circuit member 80 to be positioned at a height between the lower surface 61b of the first part 61 and the upper surface 51 of the light guide member 50. In the example shown in FIG. 2, the lower surface of the first protective film 89 and the lower surface of the second conductive part 85 are positioned at a height between the lower surface 61b of the first part 61 and the upper surface 51 of the light guide member 50. Accordingly, the thickness of the planar light source 300 can be less than when the lower surface of the circuit member 80 is positioned at a height lower than the lower surface 61b of the first part 61.

In the example shown in FIG. 2, the lower surface of the circuit member 80 is positioned at a height between the upper surface 62a of the second part 62 and the upper surface 51 of the light guide member 50. The circuit member 80 is positioned within the range of the thickness between the upper surface 51 and the lower surface 52 of the light guide member 50.

Connection Member

The planar light source 300 further includes the connection member 91. The connection member 91 is located between the first conductive part 65 of the first substrate 60 and the second conductive part 85 of the circuit member 80 and electrically connects the first conductive part 65 and the second conductive part 85. The connection member 91 also has the function of fixing the circuit member 80 to the first substrate 60.

For example, an anisotropic conductive film (ACF) can be used as the connection member 91. An ACF includes, for example, a thermosetting resin and conductive particles contained in the thermosetting resin. By using an ACF, the thickness of the connection part between the first conductive part 65 and the second conductive part 85 is easily reduced.

For example, the connection member 91, i.e., the ACF, is located between the first conductive part 65 and the second conductive part 85 with the thermosetting resin of the connection member 91 in an uncured state. Subsequently, the thermosetting resin of the connection member 91 is cured while applying pressure to the first and second conductive parts 65 and 85 in the direction of squeezing the connection member 91. Accordingly, the first conductive part 65 and the second conductive part 85 are bonded via the connection member 91 and electrically connected by the conductive particles contained in the connection member 91.

Bonding Member

The planar light source 300 further includes a bonding member 40. The bonding member 40 is located at the upper surface 61a side of the first part 61 and the upper surface 62a side of the second part 62 of the first substrate 60, bonds the first substrate 60 and the light guide member 50, and bonds the circuit member 80 and the first substrate 60. Accordingly, the bonding force between the circuit member 80 and the first substrate 60 can be higher than when only the connection member 91 is used. In the example shown in FIG. 2, the first protective film 89 of the circuit member 80 is bonded to the bonding member 40.

The bonding member 40 can be formed of, for example, a resin member that contains light-scattering particles. Using the bonding member 40 containing light-scattering particles can suppress the light emitted by the light source 10 from escaping below the bonding member 40, so that the light extraction efficiency of the light-emitting module 100 is more easily increased. Also, the bonding member 40 containing light-scattering particles can reduce the degradation of the first substrate 60 due to the light emitted by the light source 10.

Light Source

Figure 7:
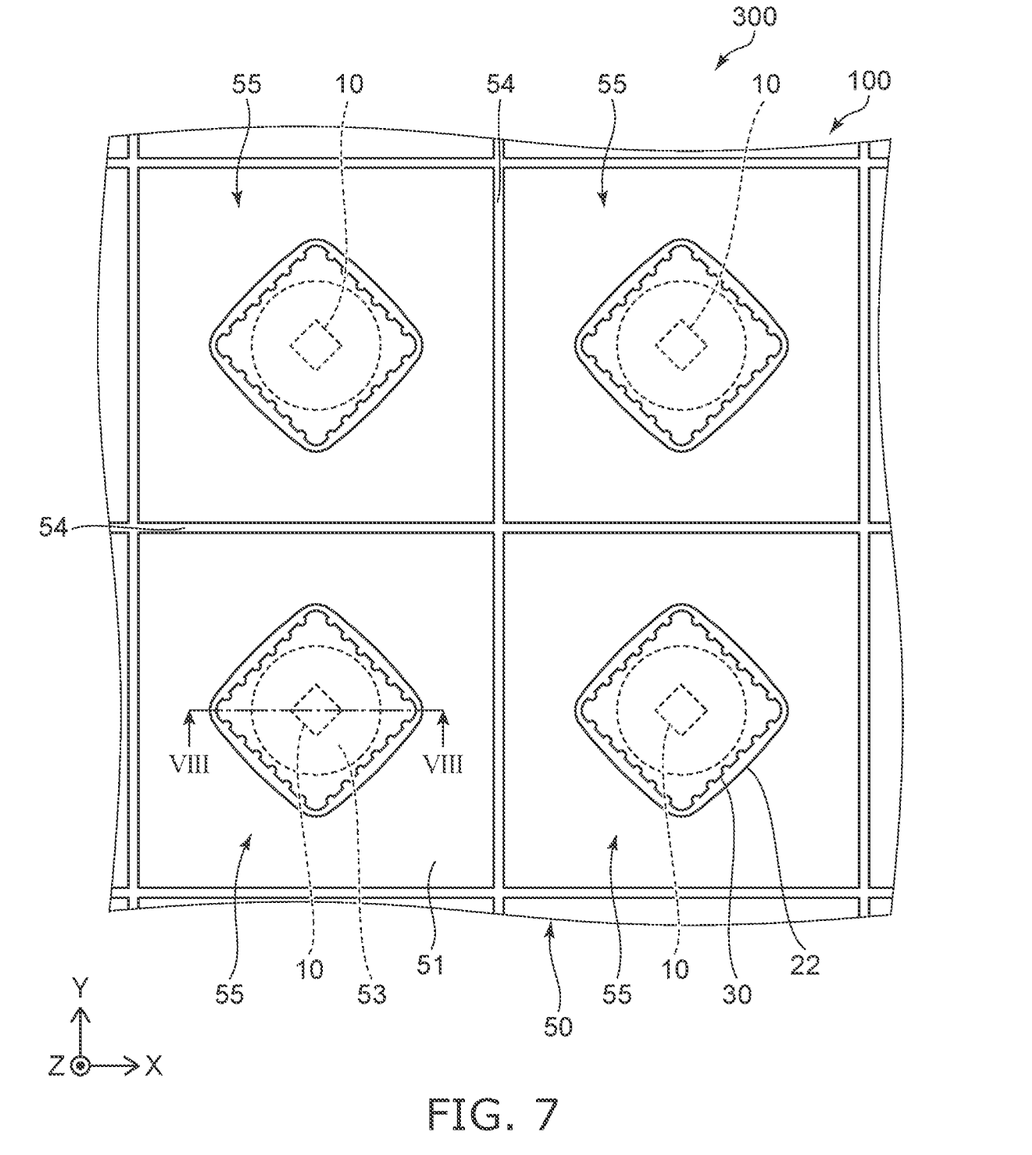
FIG. 7 is a schematic top view of a part of a planar light source of an embodiment in which a light guide member and a light source are located.
Figure 8:
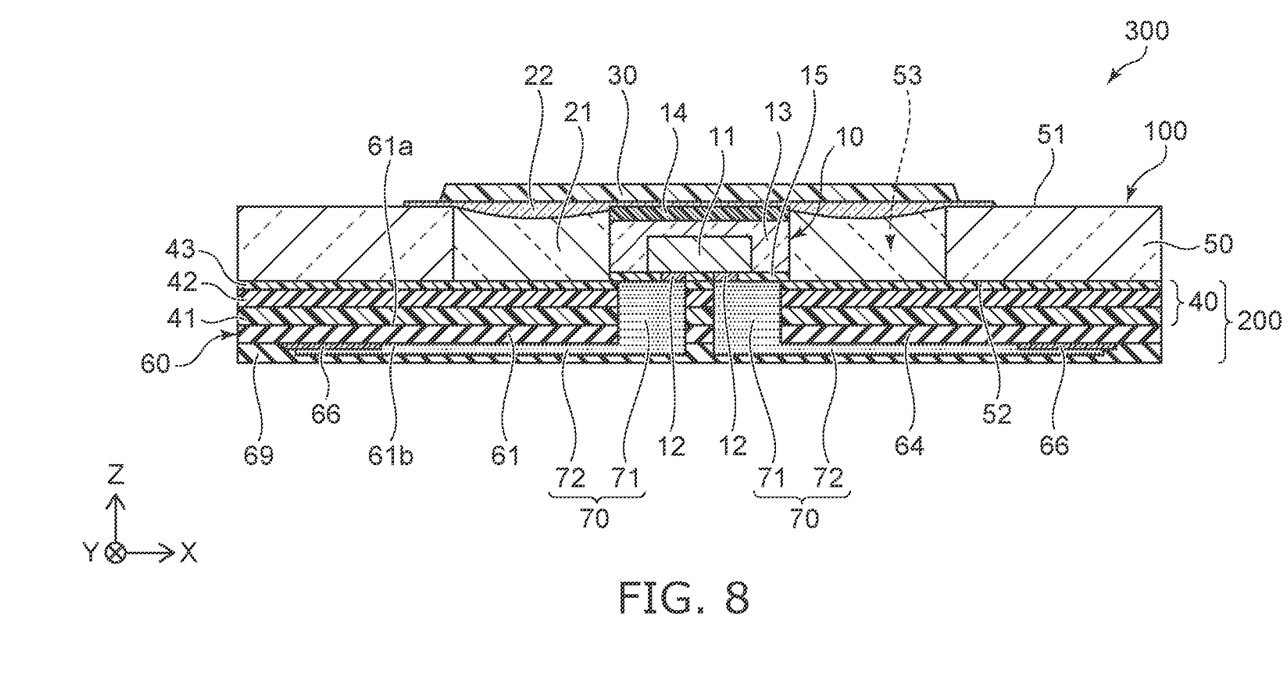
FIG. 8 is a schematic cross-sectional view along line VIII-VIII of FIG. 7.

As shown in FIG. 7, the light-emitting module 100 of the planar light source 300 includes, for example, multiple light sources 10. The light-emitting module 100 may include one light source 10. As shown in FIG. 8, the light source 10 is located at the upper surface 61a side of the first part 61 of the first substrate 60.

The light source 10 includes one or more light-emitting elements 11. The light-emitting element 11 includes a semiconductor structure body. The semiconductor structure body includes, for example, a substrate of sapphire, gallium nitride, or the like, an n-type semiconductor layer located above the substrate, a p-type semiconductor layer, and a light-emitting layer interposed between the n-type semiconductor layer and the p-type semiconductor layer. The light-emitting element 11 also includes an n-side electrode electrically connected with the n-type semiconductor layer, and a p-side electrode electrically connected with the p-type semiconductor layer. The n-side electrode and the p-side electrode are included in portions of the lower surface of the light-emitting element 11. The light source 10 further includes a pair of positive and negative electrodes 12. The pair of positive and negative electrodes 12 is included in portions of the lower surface of the light source 10. One of the pair of electrodes 12 is electrically connected with the p-side electrode, and the other is electrically connected with the n-side electrode. The light source 10 may not include the electrodes 12. When the light source 10 does not include the electrodes 12, the n-side electrode and p-side electrode of the light-emitting element 11 are included in portions of the lower surface of the light source 10. The light source 10 may not include a substrate of sapphire, gallium nitride, etc. Thereby, it is easier to make the light source 10 smaller in the third direction Z.

The light-emitting layer may have a structure that includes a single active layer such as a double heterostructure or a single quantum well structure (SQW), or may have a structure that includes an active layer group such as a multi-quantum well structure (MQW). The light-emitting layer is configured to emit visible light or ultraviolet light. The light-emitting layer is configured to emit blue to red in a range of the visible light. The semiconductor structure body that includes such a light-emitting layer can include, for example, $In_xAl_yGa_{1-x-y}N$ ($0 \leq x$, $0 \leq y$, and $x+y \leq 1$). The semiconductor structure body can include at least one light-emitting layer capable of the light emission described above. For example, the semiconductor structure body may have a structure that includes one or more light-emitting layers between the n-type semiconductor layer and the p-type semiconductor layer, or may have a structure in which the structure including the n-type semiconductor layer, the light-emitting layer, and the p-type semiconductor layer in this order is multiply repeated. When the semiconductor structure body includes multiple light-emitting layers, the multiple light-emitting layers may include light-emitting layers of different light emission peak wavelengths, or may include light-emitting layers of the same light emission peak wavelength. The light emission peak wavelengths being the same means that, for example, there may be variation of about several nm. Such combinations of light-emitting layers can be selected as appropriate; for example, when the semiconductor structure body includes two light-emitting layers, the light-emitting layers can be selected to have a combination of blue light and blue light, green light and green light, red light and red light, ultraviolet light and ultraviolet light, blue light and green light, blue light and red light, green light and red light, etc. The light-emitting layer may include multiple active layers of different light emission peak wavelengths, or may include multiple active layers of the same light emission peak wavelength.

One light source 10 includes one light-emitting element 11. One light source may include multiple light-emitting elements 11. The light emission peak wavelengths of the multiple light-emitting elements included in one light source 10 may be the same or different. For example, when one light source 10 includes two light-emitting elements, the light emission peak wavelengths of the light-emitting elements can be selected from combinations such as blue light and green light, blue light and red light, ultraviolet light and blue light, ultraviolet light and green light, ultraviolet light and red light, green light and red light, etc. For example, when one light source 10 includes three light-emitting elements, the light emission peak wavelengths of the light-emitting elements can be selected from combinations such as blue light, green light, and red light, ultraviolet light, green light, and red light, ultraviolet light, blue light, and green light, ultraviolet light, blue light, and red light, ultraviolet light, green light, and red light, etc.

In the example shown in FIG. 8, the light source 10 can further include a light-transmitting member 13 (hereinbelow, called the light source light-transmitting member). The light source light-transmitting member 13 covers the upper surface and lateral surface of the light-emitting element 11. The light-emitting element 11 can be protected by the light source light-transmitting member 13. The light source light-transmitting member 13 may be located so that at least a portion of the upper surface of the light-emitting element 11 is exposed. It is thereby easier to make the light source 10 smaller in the third direction Z.

The light source light-transmitting member 13 is transmissive to the light emitted by the light-emitting element 11. For example, the light source light-transmitting member 13 may include a light-transmitting resin, and may further include a fluorescent. For example, a silicone resin, epoxy resin, or the like can be used as the light-transmitting resin. An yttrium-aluminum-garnet-based fluorescent (e.g., $(Y, Gd)_3 (Al, Ga)_5O_{12}:Ce$), a lutetium-aluminum-garnet-based fluorescent (e.g., $Lu_3 (Al, Ga)_5O_{12}:Ce$), a terbium-aluminum-garnet-based fluorescent (e.g., $Tb_3(Al, Ga)_5O_{12}:Ce$), a CCA-based fluorescent (e.g., $Ca_{10}(PO_4)_6Cl_2:Eu$), an SAE-based fluorescent (e.g., $Sr_4Al_{14}O_{25}:Eu$), chlorosilicate-based fluorescent (e.g., $Ca_8MgSi_4O_{16}Cl_2:Eu$), a silicate-based fluorescent (e.g., (Ba, Sr, Ca, Mg)$_2$SiO$_4$:Eu), an oxynitride-based fluorescent such as a β-sialon-based fluorescent (e.g., (Si, Al)$_3$(O, N)$_4$:Eu), an α-sialon-based fluorescent (e.g., Ca(Si, Al)$_{12}$(O, N)$_{16}$:Eu), or the like, a nitride-based fluorescent such as an LSN-based fluorescent (e.g., (La, Y)$_3$Si$_6$N$_{11}$:Ce), a BSESN-based fluorescent (e.g., (Ba, Sr)$_2$Si$_5$N$_8$:Eu), an SLA-based fluorescent (e.g., SrLiAl$_3$N$_4$:Eu), a CASN-based fluorescent (e.g., CaAlSiN$_3$:Eu), a SCASN-based fluorescent (e.g., (Sr, Ca)AlSiN$_3$:Eu), or the like, a fluoride-based fluorescent such as a KSF-based fluorescent (e.g., K$_2$SiF$_6$:Mn), a KSAF-based fluorescent (e.g., K$_2$(Si$_{1-x}$Al$_x$)F$_{6-x}$:Mn, where x satisfies 0<x<1), a MGF-based fluorescent (e.g., 3.5MgO·0.5MgF$_2$·GeO$_2$:Mn), or the like, a quantum dot having a perovskite structure (e.g., (Cs, FA, MA)(Pb, Sn)(F, Cl, Br, I)$_3$, where FA and MA are respectively formamidinium and methylammonium), a Group II-VI quantum dot (e.g., CdSe), a Group III-V quantum dot (e.g., InP), a quantum dot having a chalcopyrite structure (e.g., (Ag, Cu)(In, Ga)(S, Se)$_2$), etc., can be used as the fluorescent. One type of fluorescent or multiple types of fluorescents may be used may be used as the fluorescent added to the light source light-transmitting member 13.

A wavelength conversion sheet that contains the fluorescent described above may be located above the light-emitting module 100. The wavelength conversion sheet can absorb a portion of the blue light from the light source 10 and emit yellow light, green light, and/or red light, so that the planar light source 300 can emit white light. For example, white light can be obtained by combining a light source 10 capable of a blue light emission and a wavelength conversion sheet containing a fluorescent capable of a yellow light emission. Also, the light source 10 that is capable of a blue light emission and a wavelength conversion sheet that includes a red fluorescent and a green fluorescent may be combined. Multiple wavelength conversion sheets and the light source 10 that is capable of a blue light emission may be combined. For example, a wavelength conversion sheet that contains a fluorescent capable of a red light emission and a wavelength conversion sheet that contains a fluorescent capable of a green light emission can be selected as the multiple wavelength conversion sheets. The light source 10 that includes the light-emitting element 11 capable of a blue light emission and the light source light-transmitting member 13 containing a fluorescent capable of a red light emission may be combined with a wavelength conversion sheet that includes a fluorescent capable of a green light emission.

For example, it is preferable to use the yttrium-aluminum-garnet-based fluorescent described above as a fluorescent capable of a yellow light emission contained in the wavelength conversion sheet. For example, it is preferable to use the quantum dot having the perovskite structure, the Group III-V quantum dot, or the quantum dot having the chalcopyrite structure described above, which have narrow light emission peak wavelength widths at half maximum, as a fluorescent capable of a green light emission contained in the wavelength conversion sheet. As a fluorescent capable of a red light emission contained in the wavelength conversion sheet, for example, it is preferable to use the KSF-based fluorescent, the KSAF-based fluorescent, the Group III-V quantum dot, or the quantum dot having the chalcopyrite structure described above, which have narrow light emission peak wavelength widths at half maximum similarly to the fluorescent capable of a green light emission.

The light source 10 can further include a cover member 15. The cover member is located at the lower surface of the light-emitting element 11. The cover member is located so that the lower surfaces of the electrodes 12 of the light source 10 are exposed from the cover member 15. The cover member 15 is also located at the lower surface of the light source light-transmitting member 13 covering the lateral surface of the light-emitting element 11.

The cover member 15 is reflective to the light emitted by the light-emitting element 11. The cover member 15 can include, for example, a resin member that includes a gas such as nitrogen, oxygen, or the like, a resin member that includes light-scattering particles, etc. For example, a thermoplastic resin such as an acrylic resin, polycarbonate resin, cyclic polyolefin resin, polyethylene terephthalate resin, polyester resin, or the like, a thermosetting resin such as an epoxy resin, silicone resin, etc., can be used as the resin member of the cover member 15. For example, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, etc., can be used as the light-scattering particles of the cover member 15. The cover member 15 may include both a gas and light-scattering particles.

The light source 10 can include a light-modulating member 14 (hereinbelow, called the light source light-modulating member). The light source light-modulating member 14 is included in at least a portion of the upper surface of the light source 10. The light source light-modulating member 14 is located at the upper side of the light-emitting element 11. The light source light-modulating member 14 and the light-emitting element 11 overlap in the top view, and the light source light-modulating member 14 is positioned at the upper side of the light-emitting element 11 at the overlapping part. The light source light-modulating member 14 is located at the upper side of the light source light-transmitting member 13 and adjusts the amount and/or emission direction of the light emitted from the upper surface of the light source light-transmitting member 13. The light source light-modulating member 14 is reflective and transmissive to the light emitted by the light-emitting element 11. A portion of the light emitted from the upper surface of the light source light-transmitting member 13 is reflected by the light source light-modulating member 14, and another portion of the light passes through the light source light-modulating member 14. It is preferable for the transmittance of the light source light-modulating member 14 for the peak wavelength of the light-emitting element 11 to be, for example, not less than 1% and not more than 50%, and more favorably not less than 3% and not more than 30%. By the light source 10 including the light source light-modulating member 14, the region directly above the light source 10 is less likely to be too bright. The uneven luminance of the planar light source 300 is reduced thereby.

The light source light-modulating member 14 can include, for example, a resin member that contains light-scattering particles. A material the same as or similar to the resin member of the cover member 15 can be used as the resin member of the light source light-modulating member 14. A material the same as or similar to the light-scattering particles of the cover member 15 can be used as the light-scattering particles of the light source light-modulating member 14. The light source light-modulating member 14 may be, for example, a dielectric multilayer film or a metal member of aluminum, silver, etc.

The light source 10 is not limited to the configuration shown in FIG. 8. Other configurations of the light source 10 will now be described.

The light source 10 may not include the light source light-modulating member 14. Thereby, it is easier to make the light source 10 smaller in the third direction Z than when the light source 10 includes the light source light-modulating member 14 located at the upper side of the light-emitting element 11.

The light source 10 may not include the cover member 15. For example, the lower surface of the light source 10 may include the lower surface of the light-emitting element 11, the lower surfaces of the pair of electrodes 12, and the lower surface of the light source light-transmitting member 13.

The light source 10 may be only the light-emitting element 11 alone.

The light source 10 may have a configuration in which the light source light-modulating member 14 is located at the upper surface of the light-emitting element 11 without including the cover member 15 and the light source light-transmitting member 13.

The light source 10 may have a configuration in which the light source light-transmitting member 13 is not included, the light source light-modulating member 14 is located at the upper surface of the light-emitting element 11, and the cover member 15 is located at the lower surface of the light-emitting element 11.

The shape of the light source 10 in the top view is not particularly limited. The shape of the light source 10 in the top view can be, for example, shapes such as circular, triangular, quadrilateral, hexagonal, octagonal, etc. When the shape of the light source in the top view is quadrilateral, a pair of mutually parallel outer edges of the light source 10 may be parallel to the first direction X or may be oblique to the first direction X. According to the embodiment as shown in FIG. 7, the pair of mutually parallel outer edges of the light source 10 are rotated 45° with respect to the first direction X.

Light Guide Member

As shown in FIG. 8, the light guide member 50 is located at the upper surface 61a side of the first part 61 of the first substrate 60. The light guide member 50 is transmissive to the light emitted by the light source 10. It is preferable for the transmittance of the light guide member 50 for the light emission peak wavelength of the light source 10 to be, for example, not less than 60%, and more favorably not less than 80%.

The light guide member 50 includes a housing part 53 extending from the upper surface 51 to the lower surface 52. The light source 10 is located in the housing part 53.

As shown in FIG. 7, the light guide member 50 continuously surrounds the periphery of the light source 10 in the top view. The housing part 53 is, for example, circular in the top view. The housing part 53 may be elliptic or polygonal such as triangular, quadrilateral, hexagonal, octagonal, etc., in the top view. The housing part 53 may be a recess that is open only at the lower surface 52 side of the light guide member 50. When the housing part 53 is a recess, the housing part 53 includes a bottom surface defined by the light guide member 50.

A material the same as or similar to the resin member of the cover member 15 of the light source 10 can be used as the material of the light guide member 50. Glass or the like may be used as the material of the light guide member 50. The light guide member 50 may include a fluorescent and/or light-scattering particles.

It is preferable for the thickness of the light guide member 50 in the third direction Z to be, for example, not less than 150 μm and not more than 800 μm. The light guide member 50 may be a single layer or may be a stacked body of multiple layers in the third direction Z. When the light guide member 50 includes a stacked body, a transmissive adhesive may be located between the layers. An adhesive may not be located between the layers. The layers of the stacked body may include different types of major materials or may include the same type of major material.

For example, as shown in FIG. 7, the light guide member 50 is partitioned into multiple light-emitting regions 55 by a partitioning groove 54 extending in the first direction X and the second direction Y. One light-emitting region 55 can be used as the driving unit of local dimming. FIG. 7 shows, for example, a part in which four light-emitting regions 55 are provided in the light-emitting surface of the planar light source 300. The planar light source 300 is not limited to multiple light-emitting regions 55 and may be configured as one light-emitting region 55. By the light guide member 50 including the partitioning groove 54, it is easier to improve the contrast ratio between a light-emitting region 55 in a light-emitting state and a light-emitting region 55 in a non-light-emitting state. For example, a portion of the light from the light source 10 propagating in the lateral direction through the light guide member 50 is reflected or refracted by the surface of the light guide member 50 defining the partitioning groove 54. Accordingly, the light from the light source 10 propagating in the lateral direction through the light guide member 50 is less likely to be incident on the light guide member 50 of an adjacent light-emitting region. The contrast ratio between the light-emitting region 55 in the light-emitting state and the light-emitting region 55 in the non-light-emitting state is easily improved thereby.

It is preferable for the partitioning groove 54 to extend from the upper surface 51 to the lower surface 52 of the light guide member 50. This can divide the light guide member 50 into a plurality thereby, and therefore, for example, a support member 200 that is described below and supports the light guide member 50 can have less warp due to the thermal expansion coefficient difference between the light guide member 50 and the support member 200. The occurrence of cracks in a conductive member 70 described below can be reduced by reducing the warp of the support member 200. The partitioning groove 54 may be a recess that is open at only the upper surface 51 side of the light guide member 50, or may be a recess open at only the lower surface 52 side of the light guide member 50. When the partitioning groove 54 is a recess, the partitioning groove 54 includes a bottom surface defined by the light guide member 50.

A member that is reflective to the light emitted by the light source 10 may be provided inside the partitioning groove 54. The contrast ratio between a light-emitting region 55 in a light-emitting state and a light-emitting region 55 in a non-light-emitting state can be improved thereby. A member that is reflective to the light emitted by the light source 10 may not be provided inside the partitioning groove 54.

A recess can be provided in one of the upper surface 51 or the lower surface 52 of the light guide member 50. The recess may be provided in both the upper surface 51 and the lower surface 52. A straight line, curve, point, etc., are examples of the shape of the recess in the top view. By providing the recess in the light guide member 50, the light extraction efficiency can be increased.

First Light-Transmitting Member

The planar light source 300 further includes a first light-transmitting member 21. The first light-transmitting member 21 is transmissive to the light emitted by the light source 10. For example, it is preferable for the transmittance of the first light-transmitting member 21 for the light emission peak wavelength of the light source 10 to be not less than 60%, and more favorably not less than 80%.

As shown in FIG. 8, the first light-transmitting member 21 is positioned between the light guide member 50 and the lateral surface of the light source 10 in a cross-sectional view. The light from the light source 10 can be easily propagated throughout a wider region in the lateral direction by the light guide member 50. It is preferable for the light guide member 50 to contact the lateral surface of the first light-transmitting member 21. Thereby, the light from the light source 10 propagating through the first light-transmitting member 21 is more easily incident on the light guide member 50.

The first light-transmitting member 21 contacts the lateral surface of the light source 10. Accordingly, the light from the light source 10 is more easily incident on the first light-transmitting member 21. The light from the light source 10 that is incident on the first light-transmitting member 21 propagates in the lateral direction through the first light-transmitting member 21.

The first light-transmitting member 21 continuously surrounds the periphery of the light source 10 in the top view. Accordingly, the light from the light source 10 is more easily incident on the first light-transmitting member 21 in directions 360° around the light source 10.

It is preferable for the first light-transmitting member 21 to be provided to leave at least a portion of the upper surface of the light source 10 exposed. Thereby, it is easier to make the planar light source 300 smaller in the third direction Z than when the first light-transmitting member 21 covers the entire upper surface of the light source 10. The first light-transmitting member 21 may be provided to leave the entire upper surface of the light source 10 exposed.

The first light-transmitting member 21 may cover the entire upper surface of the light source 10. By the first light-transmitting member 21 covering the entire upper surface of the light source 10, the adjustment of the luminance in the region directly above the light source 10 is easier. For example, the luminance in the region directly above the light source 10 can be adjusted by modifying the thickness of the part of the first light-transmitting member 21 covering the upper surface of the light source 10. Easier adjustment of the luminance in the region directly above the light source 10 makes it easier to reduce the uneven luminance of the planar light source 300.

In the third direction Z, the first light-transmitting member 21 may be a single layer or may be a stacked body of multiple layers. The first light-transmitting member 21 may contain a fluorescent and/or light-scattering particles. When the first light-transmitting member 21 is a stacked body, individual layers may or may not contain a fluorescent and/or light-scattering particles. For example, the first light-transmitting member 21 may include a layer containing a fluorescent and a layer not containing a fluorescent. For example, a material the same as or similar to the resin member of the cover member 15 can be used as the material of the first light-transmitting member 21.

Light-Modulating Member

The planar light source 300 further includes a light-modulating member 30. The light-emitting surface of the planar light source 300 includes the upper surface 51 of the light guide member 50 and the upper surface of the light-modulating member 30. The light-modulating member 30 is reflective and transmissive to the light emitted by the light source 10. A portion of the light emitted from the light source 10 is reflected by the light-modulating member 30, and another portion of the light passes through the light-modulating member 30. The transmittance of the light-modulating member 30 for the light emission peak wavelength of the light source 10 is less than the transmittance of the light guide member 50 for the light emission peak wavelength of the light source 10. It is preferable for the transmittance of the light-modulating member 30 for the peak wavelength of the light source 10 to be, for example, not less than 1% and not more than 50%, and more favorably not less than 3% and not more than 30%.

The light-modulating member 30 can include, for example, a resin member (hereinbelow, called the light-modulating resin member), and a reflector (hereinbelow, called the light-modulating reflector) contained in the light-modulating resin member. A material the same as or similar to the resin member of the cover member 15 can be used as the material of the light-modulating resin member. A material the same as or similar to the light-scattering particles of the cover member 15 can be used as the material of the light-modulating reflector. A gas such as nitrogen, oxygen, etc., may be used as the light-modulating reflector. The light-modulating member 30 may include both a gas and light-scattering particles. The light-modulating member 30 may be a single layer or may be a stacked body of multiple layers.

The light-modulating member 30 is located above the light source 10. As shown in FIG. 7, the light-modulating member 30 and the light source 10 overlap in the top view. By positioning the light-modulating member 30 above the light source 10, the region directly above the light source 10 can be suppressed from being too bright, and uneven luminance of the light-emitting surface of the planar light source 300 can be easily reduced.

Second Light-Transmitting Member

The planar light source 300 further includes a second light-transmitting member 22. The second light-transmitting member 22 is transmissive to the light emitted by the light source 10. It is preferable for the transmittance of the second light-transmitting member 22 for the light emission peak wavelength of the light source 10 to be, for example, not less than 60%, and more favorably not less than 80%.

As shown in FIG. 8, the second light-transmitting member 22 is located between the light source 10 and the light-modulating member 30 and between the first light-transmitting member 21 and the light-modulating member 30 in a cross-sectional view. The second light-transmitting member 22 bonds the light source 10 and the light-modulating member 30 and bonds the first light-transmitting member 21 and the light-modulating member 30. The second light-transmitting member 22 contacts the upper surface of the light source 10, the upper surface of the first light-transmitting member 21, and the lower surface of the light-modulating member 30.

The light-modulating member 30 is located above the first light-transmitting member 21 with the second light-transmitting member 22 interposed. The light-modulating member 30, the second light-transmitting member 22, and the first light-transmitting member 21 overlap in the top view. By positioning the light-modulating member 30 above the first light-transmitting member 21, the region directly above the first light-transmitting member 21 (the peripheral region of the light source 10) can be suppressed from being too bright, and uneven luminance of the light-emitting surface of the planar light source 300 can be easily reduced.

The maximum thickness of the second light-transmitting member 22 in the third direction Z is less than the maximum thickness of the first light-transmitting member 21 in the third direction Z.

There are cases where the upper surface of the first light-transmitting member 21 becomes a recessed surface due to contraction of the resin when forming the first light-transmitting member 21. In such a case, the placement surface of the light-modulating member 30 (the upper surface of the second light-transmitting member 22) can be easily made flat by the second light-transmitting member 22. The light-modulating member is more easily formed thereby.

For example, a material the same as or similar to the resin member of the first light-transmitting member 21 can be used as the material of the second light-transmitting member 22. In such a case, the refractive index difference between the first light-transmitting member 21 and the second light-transmitting member 22 can be reduced. The reflection of the light at the interface between the first light-transmitting member 21 and the second light-transmitting member 22 can be reduced thereby, and it is easier to increase the upward light extraction amount. The second light-transmitting member 22 may include a fluorescent and/or light-scattering particles.

Support Member

The planar light source 300 further includes the support member 200. The light-emitting module 100 is located above the support member 200, and the support member 200 supports the light-emitting module 100. The light guide member 50 is located above the support member 200 so that the lower surface 52 faces the upper surface of the support member 200.

The support member 200 includes the bonding member 40 and the first substrate 60 described above. For example, the bonding member 40 has a stacked structure of multiple members. The bonding member 40 includes, for example, a first member 41, a second member 42 located above the first member 41, and a third member 43 located above the second member 42. The bonding member 40 may have a single-layer structure including one of the first member 41, the second member 42, or the third member 43. The bonding member 40 may have a two-layer structure including two of the first member 41, the second member 42, or the third member 43.

The first member 41 is located between the upper surface 61a of the first part 61 of the first substrate 60 and the second member 42 and bonds the first substrate 60 and the second member 42. The first member 41 can include, for example, a resin member that contains light-scattering particles. For example, a material the same as or similar to the resin member of the cover member 15 can be used as the resin member of the first member 41. For example, a material the same as or similar to the light-scattering particles of the cover member 15 can be used as the light-scattering particles of the first member 41. A sheet-like optically clear adhesive may be used as the first member 41.

It is preferable for the refractive index of the resin member of the first member 41 to be less than the refractive index of the resin member of the second member 42. By setting the refractive index of the resin member of the first member 41 to be less than the refractive index of the resin member of the second member 42, a portion of the light traveling from the second member 42 to the first member 41 is totally reflected more easily at the interface between the second member 42 and the first member 41. The escape of light below the light-emitting module 100 can be reduced thereby, and the light extraction efficiency of the light-emitting module 100 is therefore more easily increased. The second member 42 is located below the light guide member 50, below the light source 10, below the first light-transmitting member 21, and below the partitioning groove 54. The second member 42 is reflective to the light emitted by the light source 10. The second member 42 can include a resin member, and a reflector contained in the resin member. For example, a material the same as or similar to the resin member of the cover member 15 can be used as the resin member of the second member 42. A material the same as or similar to the light-scattering particles of the cover member 15 can be used as the material of the reflector of the second member 42. A gas such as nitrogen, oxygen, etc., may be used as the reflector of the second member 42. The second member 42 may contain both a gas and light-scattering particles as the reflector.

It is preferable for the refractive index of the reflector of the second member 42 to be less than the refractive index of the resin member of the second member 42. By setting the refractive index of the reflector of the second member 42 to be less than the refractive index of the resin member of the second member 42, a portion of the light from the light source 10 incident on the second member 42 is totally reflected more easily at the interface between the resin member of the second member 42 and the reflector of the second member 42. The escape of light downward from the second member 42 can be reduced thereby, and the light extraction efficiency of the light-emitting module 100 is therefore more easily increased.

When the refractive index of the reflector of the second member 42 is less than the refractive index of the resin member of the second member 42, it is preferable for the refractive index of the resin member of the second member 42 to be greater than the refractive index of the light guide member 50. The refractive index difference between the resin member of the second member 42 and the reflector of the second member 42 is easily increased thereby, and a portion of the light from the light source 10 that is incident on the second member 42 is therefore totally reflected more easily at the interface between the resin member of the second member 42 and the reflector of the second member 42.

The third member 43 is located between the second member 42 and the lower surface 52 of the light guide member 50 and bonds the second member 42 and the light guide member 50. The light source 10 is located above the third member 43 inside the housing part 53 of the light guide member 50. The third member 43 can include, for example, a resin member that contains light-scattering particles. For example, a material the same as or similar to the resin member of the cover member 15 can be used as the resin member of the third member 43. For example, a material the same as or similar to the light-scattering particles of the cover member 15 can be used as the light-scattering particles of the third member 43. A sheet-like optically clear adhesive may be used as the third member 43.

It is preferable for the refractive index of the resin member of the third member 43 to be less than the refractive index of the light guide member 50. By setting the refractive index of the resin member of the third member 43 to be less than the refractive index of the light guide member 50, a portion of the light traveling from the light guide member 50 to the third member 43 is totally reflected more easily at the interface between the light guide member 50 and the third member 43. The escape of light below the light-emitting module 100 can be reduced thereby, and the light extraction efficiency of the light-emitting module 100 is therefore more easily increased.

It is preferable for the refractive index of the resin member of the third member 43 to be less than the refractive index of the first light-transmitting member 21. By setting the refractive index of the resin member of the third member 43 to be less than the refractive index of the first light-transmitting member 21, a portion of the light traveling from the first light-transmitting member 21 to the third member 43 is totally reflected more easily at the interface between the first light-transmitting member 21 and the third member 43. The escape of light below the light-emitting module 100 can be reduced thereby, and the light extraction efficiency of the light-emitting module 100 is therefore more easily increased.

The first substrate 60 further includes a first conductive part 66 located at the lower surface of the first base member 64. A material the same as or similar to the first conductive part 65 can be used as the material of the first conductive part 66.

The support member 200 further includes the conductive member 70. The conductive member 70 includes, for example, a resin, and metal particles contained in the resin. For example, an epoxy resin or phenol resin can be used as the resin of the conductive member 70. For example, particles of copper or silver can be used as the metal particles of the conductive member 70.

The conductive member 70 includes a connection part 71 and a wiring part 72. The connection part 71 extends through the bonding member 40 and the first substrate 60 in the third direction Z. The wiring part 72 is connected with the connection part 71 and is located at the lower surface 61b of the first part 61 of the first substrate 60. For example, the connection part 71 and the wiring part 72 can be formed as a continuous body of the same material. A portion of the wiring part 72 connects the first conductive part 66 at the lower surface 61b of the first part 61.

A pair of conductive members 70 is separated from each other and is provided to correspond to the pair of positive and negative electrodes 12 of the light source 10. The connection part 71 of one conductive member 70 of the pair of conductive members 70 is connected with the positive-side electrode 12 below the light source 10, and the connection part 71 of the other conductive member 70 is connected with the negative-side electrode 12 below the light source 10. The electrodes 12 of the light source 10 are electrically connected with the first conductive parts 66 of the first substrate 60 via the conductive member 70. The first conductive parts 66 are electrically connected with the first conductive part 65 shown in FIG. 2A.

The support member 200 further includes a third protective film 69. The third protective film 69 is located at the lower surface 61b side of the first part 61 of the first substrate 60 and covers the conductive member 70 and the first conductive part 66. The third protective film 69 is formed of an insulative material. For example, a material the same as or similar to the first protective film 89 can be used as the material of the third protective film 69.

Other embodiments will now be described with reference to FIGS. 3A, 4, 5, and 6. FIGS. 3A, 4, 5, and 6 are schematic cross-sectional views of portions the same as or similar to that of FIG. 2. The configuration and effects described in the first embodiment also are applicable to the other embodiments except for inconsistencies with the description and drawings of the other embodiments.

Second Embodiment

Figure 3A:
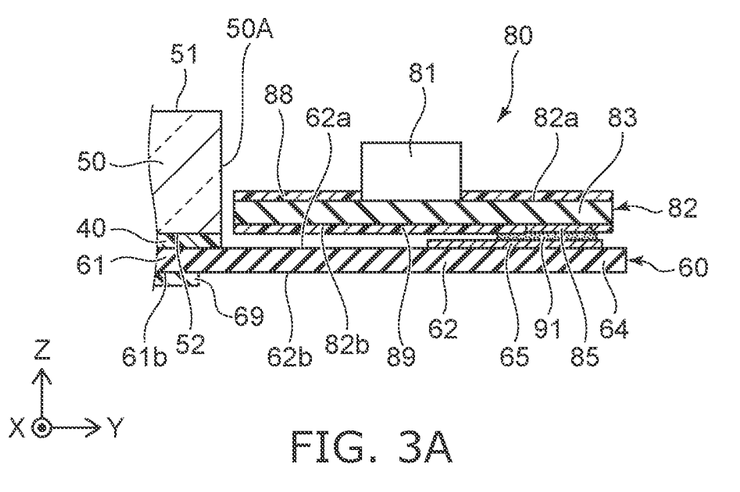
FIG. 3A is a schematic cross-sectional view of a planar light source of a second embodiment.

As shown in FIG. 3A, the bonding member 40 may be located above the first part 61 of the first substrate 60 and may not be located above the second part 62. The circuit member 80 is bonded to the first substrate 60 by the connection member 91. By not locating the bonding member 40 at the second part 62, the height of the circuit member 80 from the upper surface 62a of the second part 62 is more easily reduced. The thickness of the planar light source 300 is more easily reduced thereby.

Figure 3B:
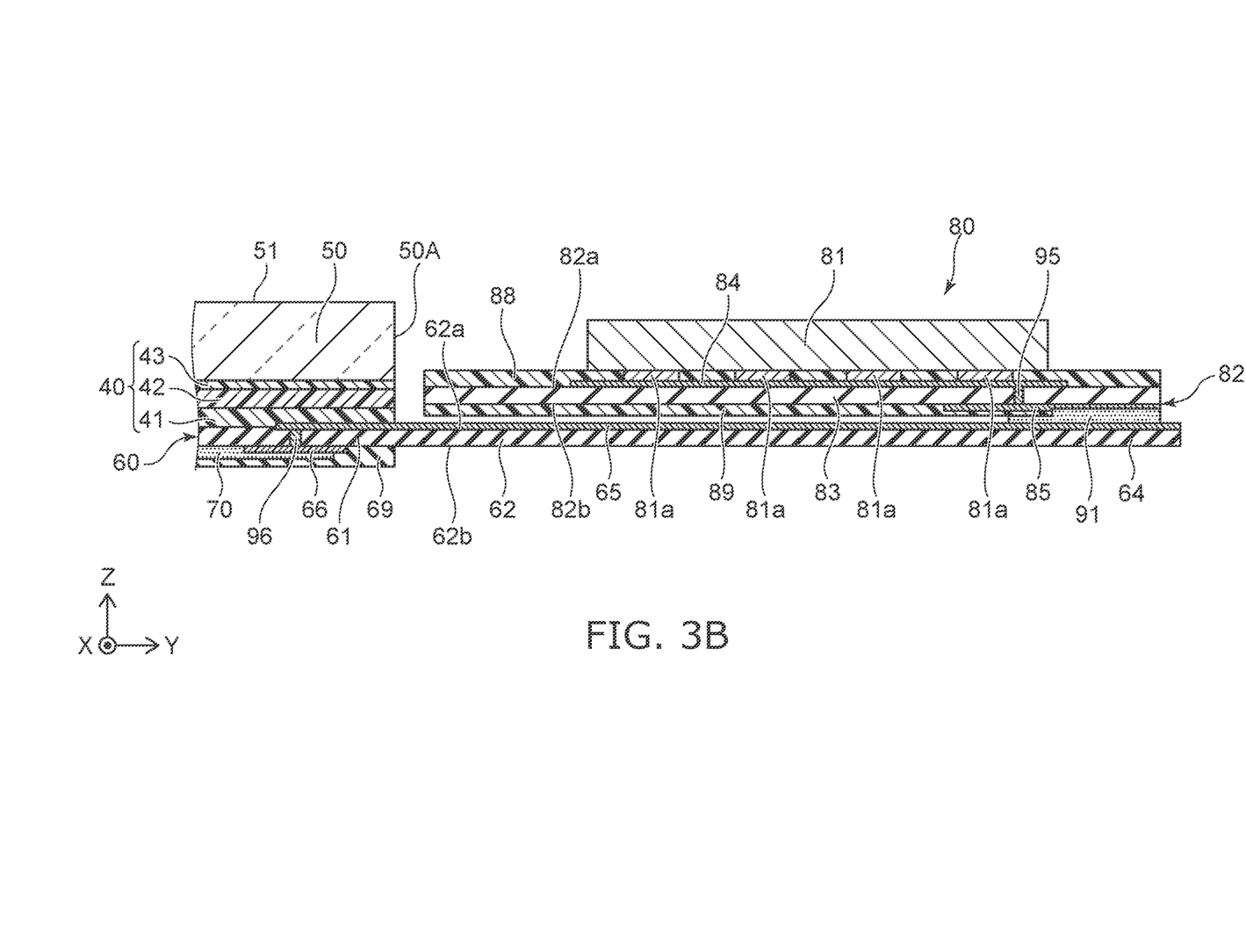
FIG. 3B is a detailed schematic cross-sectional view of a circuit member of the second embodiment.

FIG. 3B is a detailed schematic cross-sectional view of the circuit member 80 of the second embodiment.

Second conductive parts of the second substrate 82 are located at the upper surface and lower surface of the second base member 83. An upper surface-side second conductive part 84 is located at the upper surface of the second base member 83. Multiple electrode terminals 81a are located at the surface of the electronic element 81 facing the upper surface 82a of the second substrate 82. For example, the electrode terminals 81a are bonded to the upper surface-side second conductive part 84 via a bonding member such as solder, etc. Thereby, the electronic element 81 is electrically connected with the upper surface-side second conductive part 84. The second protective film 88 covers the upper surface of the second base member 83 and the upper surface-side second conductive part 84. The bonding surface of the upper surface-side second conductive part 84 with the electrode terminal 81a is exposed from the second protective film 88. The electrical connection structure between the second conductive part of the second substrate 82 and the electronic element 81 illustrated in FIG. 3B also is applicable to other embodiments.

The lower surface-side second conductive part 85 is located at the lower surface of the second base member 83. The upper surface-side second conductive part 84 and the lower surface-side second conductive part 85 are electrically connected via a third conductive part 95. The third conductive part 95 extends from the upper surface to the lower surface of the second base member 83 of the second substrate 82. For example, the third conductive part 95 is formed of a metal material.

First conductive parts of the first substrate 60 are located at the upper surface and lower surface of the first base member 64. The upper surface-side first conductive part 65 is located at the upper surface of the first base member 64. The upper surface-side first conductive part 65 is continuous between the first part 61 and the second part 62 of the first substrate 60. The connection member 91 is located between a portion of the upper surface-side first conductive part 65 of the first substrate 60 and a portion of the lower surface-side second conductive part 85 of the second substrate 82. The upper surface-side first conductive part 65 of the first substrate 60 and the lower surface-side second conductive part 85 of the second substrate 82 are electrically connected via the connection member 91.

The first protective film 89 is located between the lower surface of the second base member 83 of the second substrate 82 and the upper surface-side first conductive part 65 of the first substrate 60. The first protective film 89 covers part of the lower surface-side second conductive part 85 of the second substrate 82 and part of the upper surface-side first conductive part 65 of the first substrate 60 other than the location of the connection by the connection member 91.

The lower surface-side first conductive part 66 is located at the lower surface of the first base member 61 at the first part 61 of the first substrate 60. The lower surface-side first conductive part 66 is electrically connected with the light source 10 via the conductive member 70. Also, the lower surface-side first conductive part 66 is electrically connected with the upper surface-side first conductive part 65 via a fourth conductive part 96 located at the first part 61 of the first substrate 60. The fourth conductive part 96 extends from the upper surface to the lower surface of the first base member 64 of the first substrate 60. For example, the fourth conductive part 96 is formed of a metal material.

In the example shown in FIG. 3B, the electronic element 81 is electrically connected with the light source 10 via the second conductive parts 84 and 85 of the second substrate 82, the third conductive part 95, the connection member 91, the first conductive parts 65 and 66 of the first substrate 60, the fourth conductive part 96, and the conductive member 70.

Third Embodiment

Figure 4:
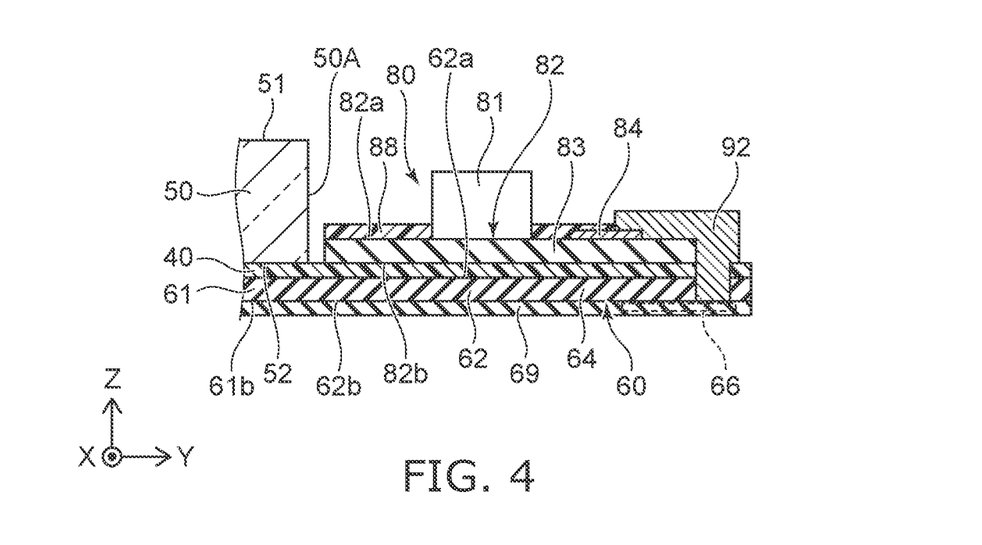
FIG. 4 is a schematic cross-sectional view of a planar light source of a third embodiment.

As shown in FIG. 4, the second substrate 82 of the circuit member 80 includes the second conductive part 84 located at the upper surface of the second base member 83. For example, the multiple second conductive parts 84 are arranged in the first direction X. The second part 62 of the first substrate 60 includes the first conductive part 66 located at the lower surface of the first base member 64. For example, multiple first conductive parts 66 are arranged in the first direction X. The lower surface and end surface of the first conductive part 66 are covered with the third protective film 69.

The second conductive part 84 and the first conductive part 66 are electrically connected by a connection member 92. The connection member 92 extends through the bonding member 40 and the first substrate 60 at the second part 62 of the first substrate 60 and reaches the first conductive part 66. The lower end portion of the connection member 92 contacts the first conductive part 66. The upper portion of the connection member 92 contacts the second conductive part 84 at the upper surface 82a side of the second substrate 82. For example, a material the same as or similar to the conductive member 70 can be used as the material of the connection member 92.

According to the third embodiment, the circuit member 80 is bonded to the first substrate 60 using the bonding member 40 located between the lower surface 82b of the second substrate 82 and the upper surface 62a of the second part 62 of the first substrate 60. The bonding strength can be increased because the entire surface of the lower surface 82b of the second substrate 82 can be bonded to the first substrate 60.

Because a conductive part is not positioned between the lower surface 82b of the second substrate 82 and the upper surface 62a of the second part 62 of the first substrate 60, the part between the lower surface 82b of the second substrate 82 and the upper surface 62a of the second part 62 of the first substrate 60 can be thin compared to the configuration of FIG. 2. The thickness of the planar light source 300 is easily reduced thereby.

Fourth Embodiment

Figure 5:
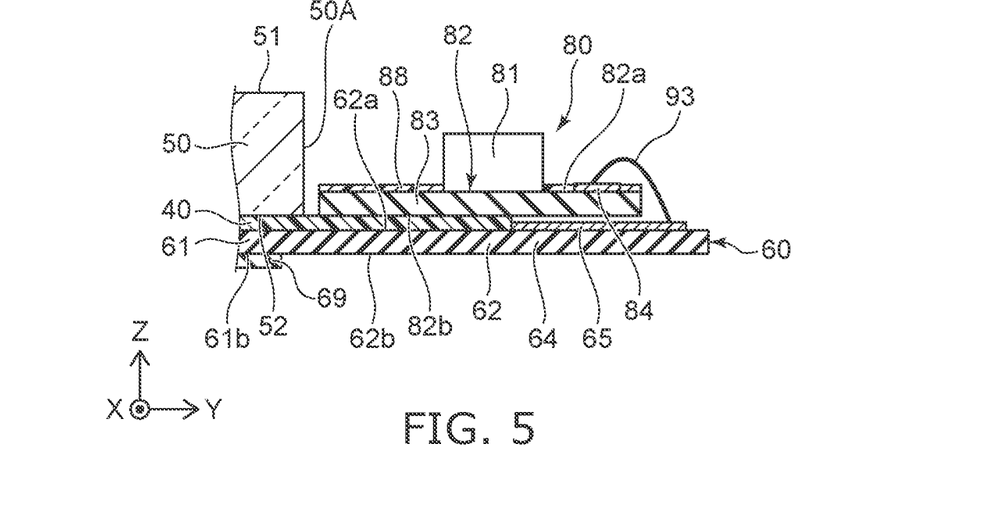
FIG. 5 is a schematic cross-sectional view of a planar light source of a fourth embodiment.

As shown in FIG. 5, the first conductive part 65 located at the upper surface 82a of the second substrate 82 and the second conductive part 84 located at the upper surface 62a of the second part 62 of the first substrate 60 may be electrically connected using a connection member 93, i.e., a metal wire. In such a case, the connection with the first conductive part 65 is easier even when the number of the second conductive parts 84 is increased and the multiple second conductive parts 84 are arranged at a narrow pitch in the first direction X. The width in the first direction X of the second conductive part 84 can be reduced due to the connection configuration in which the end portion of the connection member 93, i.e., the wire, is bonded to the second conductive part 84. It is preferable for the uppermost end of the connection member 93 to be positioned lower than the upper surface 51 of the light guide member 50.

According to a fourth embodiment, the circuit member 80 is bonded to the first substrate 60 using the bonding member 40 located between the lower surface 82b of the second substrate 82 and the upper surface 62a of the second part 62 of the first substrate 60.

Fifth Embodiment

Figure 6:
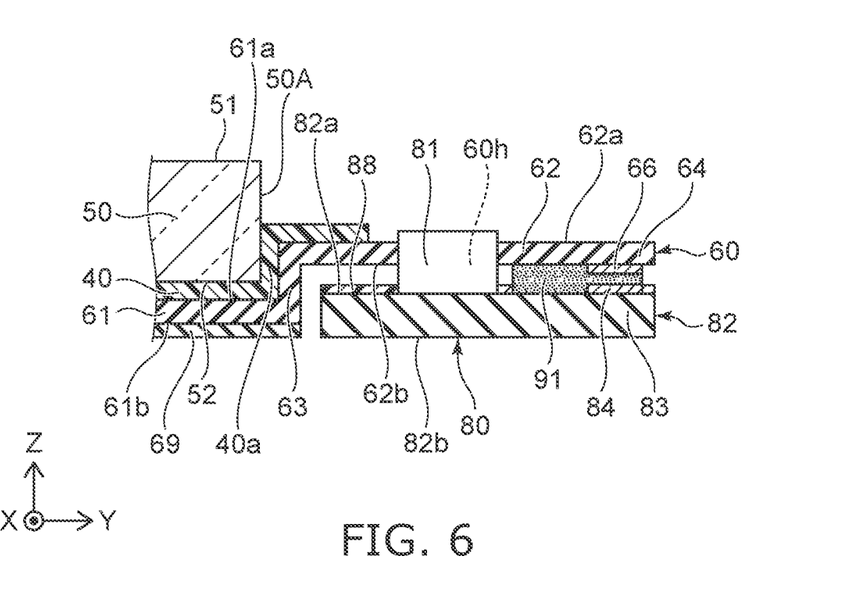
FIG. 6 is a schematic cross-sectional view of a planar light source of a fifth embodiment.

As shown in FIG. 6, the first substrate 60 is a flexible substrate that can be bent. The first substrate 60 includes a third part 63 between the first part 61 and the second part 62. The third part 63 extends from the first part 61 in a direction perpendicular to the upper surface 61a of the first part 61 and is connected to the second part 62. The direction perpendicular to the upper surface 61a of the first part 61 is a direction from the lower surface 52 toward the upper surface 51 of the light guide member 50, and the third part 63 extends from the first part 61 positioned at the lower surface 52 side of the light guide member 50 to approach the upper surface 51 of the light guide member 50. The second part 62 is positioned at a height between the lower surface 52 and the upper surface 51 of the light guide member 50.

The first substrate 60 also includes a hole portion 60h located at the second part 62. The hole portion 60h extends between the upper surface 62a and the lower surface 62b of the second part 62. In the top view, the hole portion 60h has a shape such that the entire hole portion 60h is surrounded with the first substrate 60, or such that a portion of the hole portion 60h is continuous with the outer edge of the first substrate 60.

The second substrate 82 of the circuit member 80 is located at the lower surface 62b side of the second part 62 of the first substrate 60, and a portion of the electronic element 81 is positioned in the hole portion 60h. The upper surface of the electronic element 81 is positioned at a height between the upper surface 62a of the second part 62 and the upper surface 51 of the light guide member 50. The electronic element 81 overlaps the light guide member 50 in a direction parallel to the upper surface 61a of the first part 61 of the first substrate 60.

By positioning a portion of the electronic element 81 in the hole portion 60h of the second part 62, the thickness of the parts of the first substrate 60 and the circuit member 80 overlapping in the third direction Z can be reduced compared to when the entire circuit member 80 is located at the upper surface 62a side or the lower surface 62b side of the second part 62. The thickness of the planar light source 300 can be reduced thereby.

For example, a connection member 91 that is an ACF electrically connects the first conductive part 66 of the first substrate 60 and the second conductive part 84 of the second substrate 82 and bonds the first substrate 60 and the second substrate 82. The second substrate 82 also can be located above a housing in which the planar light source 300 is located. In such a case, the heat emitted by the electronic element 81 can be dissipated to the chassis via the second substrate 82.

The third part 63 of the first substrate 60 is positioned between the circuit member 80 and the first outermost lateral surface 50A of the light guide member 50. Accordingly, when the circuit member 80 is located at the second part 62 of the first substrate 60, the circuit member 80 does not easily contact the first outermost lateral surface 50A of the light guide member 50, and the first outermost lateral surface 50A is not easily damaged.

A portion 40a of the bonding member 40 is located between the third part 63 and the first outermost lateral surface 50A of the light guide member 50. The third part 63 is bonded to the first outermost lateral surface 50A of the light guide member 50 with the portion 40a of the bonding member 40.

When the bonding member 40 contains light-scattering particles, the light that propagates through the light guide member 50 and travels toward the first outermost lateral surface 50A can be reflected toward the upper surface 51 side by the portion 40a of the bonding member 40. Accordingly, the luminance of the light extracted from the upper surface 51 of the light guide member 50 can be increased at the vicinity of the first outermost lateral surface 50A, to which light does not easily propagate due to the large distance from the light source 10.

To reduce the planar size of the planar light source 300, it is preferable for the connection members 91 to 93 to be positioned inward of the outer edge of the first substrate 60 in the top view.

What is claimed is:

1. A planar light source comprising:
 a first substrate comprising a first part extending to a first outer edge of the first substrate in a top view, and a second part extending from the first part to a second outer edge of the first substrate opposite the first outer edge in the top view;
 a light source located at an upper surface side of the first part;
 a light guide member located at the upper surface side of the first part and extending to the first outer edge of the first substrate in the top view; and
 a circuit member overlapping the light guide member in a direction parallel to an upper surface of the first part, the circuit member comprising:
  a second substrate located at an upper surface side or a lower surface side of the second part, and
  an electronic element located on the second substrate, the electronic element overlapping the second part of the first substrate in the top view.

2. The planar light source according to claim 1, wherein:
 an outer edge of the circuit member is positioned inward of the second outer edge of the first substrate in the top view.

3. The planar light source according to claim 2, wherein:
 an upper surface of the circuit member is positioned between an upper surface of the light guide member and a lower surface of the light guide member in a direction perpendicular to the upper surface of the first part.

4. The planar light source according to claim 3, wherein:
 a lower surface of the circuit member is positioned between a lower surface of the first part and the upper surface of the light guide member in the direction perpendicular to the upper surface of the first part.

5. The planar light source according to claim 1, further comprising:
 a bonding member located at the upper surface side of the first part and the upper surface side of the second part; wherein:
 the bonding member bonds the first substrate and the light guide member and bonds the circuit member and the first substrate.

6. The planar light source according to claim 1, wherein:
 the second substrate is located at the upper surface side of the second part;
 the first substrate comprises:
  a first base member, and
  a first conductive part located at an upper surface of the first base member at the second part;
 the second substrate comprises:
  a second base member, and
  a second conductive part located at a lower surface of the second base member;
 the planar light source further comprises a connection member located between the first conductive part and the second conductive part; and
 the connection member electrically connects the first conductive part and the second conductive part.

7. The planar light source according to claim 1, wherein:
 the second substrate is located at the upper surface side of the second part;
 the first substrate comprises:
  a first base member, and
  a first conductive part located at a lower surface of the first base member at the second part;
 the second substrate includes:
  a second base member, and
  a second conductive part located at an upper surface of the second base member;
 the planar light source further comprises a connection member extending through the first substrate at the second part; and
 the connection member electrically connects the first conductive part and the second conductive part.

8. The planar light source according to claim 1, wherein:
 the first substrate further comprises:
  a third part extending from the first part in a direction perpendicular to the upper surface of the first part, the third part being connected to the second part, and
  a hole portion provided in the second part;
 the second substrate is located at the lower surface side of the second part; and
 a portion of the electronic element is positioned in the hole portion.

9. The planar light source according to claim 2, wherein:
 the first substrate further comprises:
  a third part extending from the first part in a direction perpendicular to the upper surface of the first part, the third part being connected to the second part, and
  a hole portion provided in the second part;
 the second substrate is located at the lower surface side of the second part; and
 a portion of the electronic element is positioned in the hole portion.

10. The planar light source according to claim 3, wherein:
 the first substrate further comprises:
  a third part extending from the first part in a direction perpendicular to the upper surface of the first part, the third part being connected to the second part, and
  a hole portion provided in the second part;
 the second substrate is located at the lower surface side of the second part; and
 a portion of the electronic element is positioned in the hole portion.

11. The planar light source according to claim 8, further comprising:
 a bonding member located between the third part and the light guide member.

12. The planar light source according to claim 9, further comprising:
a bonding member located between the third part and the light guide member.

13. The planar light source according to claim 10, further comprising:
a bonding member located between the third part and the light guide member.

14. The planar light source according to claim 11, wherein:
the bonding member contains light-scattering particles.

15. The planar light source according to claim 12, wherein:
the bonding member contains light-scattering particles.

16. The planar light source according to claim 13, wherein:
the bonding member contains light-scattering particles.

17. A planar light source comprising:
a first substrate comprising:
a first part,
a second part,
a third part extending from the first part in a direction perpendicular to an upper surface of the first part, the third part being connected to the second part, and
a hole portion provided in the second part;
a light source located at an upper surface side of the first part;
a light guide member located at the upper surface side of the first part; and
a circuit member overlapping the light guide member in a direction parallel to the upper surface of the first part, the circuit member comprising:
a second substrate located at a lower surface side of the second part, and
an electronic element located on the second substrate, wherein a portion of the electronic element is positioned in the hole portion.

18. The planar light source according to claim 17, further comprising:
a bonding member located between the third part and the light guide member.

19. The planar light source according to claim 18, wherein:
the bonding member contains light-scattering particles.

20. The planar light source according to claim 1, wherein an entirety of the second substrate overlaps the second part of the first substrate in the top view.

\* \* \* \* \*